United States Patent
Sato

(10) Patent No.: US 7,989,539 B2
(45) Date of Patent: Aug. 2, 2011

(54) NBR COMPOSITION

(75) Inventor: Takeshi Sato, Kanagawa (JP)

(73) Assignee: NOK Corporation, Tokyo (JP)

( * ) Notice: Subject to any disclaimer, the term of this patent is extended or adjusted under 35 U.S.C. 154(b) by 344 days.

(21) Appl. No.: 12/224,461

(22) PCT Filed: Jan. 26, 2007

(86) PCT No.: PCT/JP2007/051235
§ 371 (c)(1),
(2), (4) Date: Aug. 27, 2008

(87) PCT Pub. No.: WO2007/099724
PCT Pub. Date: Sep. 7, 2007

(65) Prior Publication Data
US 2009/0030133 A1 Jan. 29, 2009

(30) Foreign Application Priority Data
Feb. 28, 2006 (JP) ................................. 2006-051785

(51) Int. Cl.
*B60C 1/00* (2006.01)
(52) U.S. Cl. ........................................ 524/496; 524/495
(58) Field of Classification Search .................. 524/495, 524/496
See application file for complete search history.

(56) References Cited

U.S. PATENT DOCUMENTS
2003/0045624 A1 * 3/2003 Matsunaga et al. ........... 524/492

FOREIGN PATENT DOCUMENTS

| JP | 61-225243 | 10/1986 |
|---|---|---|
| JP | 03-111439 | 5/1991 |
| JP | 2000-212333 | 8/2000 |
| JP | 2000-281839 | 10/2000 |
| JP | 2004-075831 | 3/2004 |
| JP | 2004-217849 | 8/2004 |
| JP | 2005-272580 | 10/2005 |
| JP | 2006-037044 | 2/2006 |
| JP | 2006037044 A * | 2/2006 |

OTHER PUBLICATIONS

International Preliminary Report on Patentability and Written Opinion from corresponding PCT application No. PCT/JP2009/060489 dated Jan. 11, 2011, 6 pages.

* cited by examiner

*Primary Examiner* — Peter D Mulcahy
(74) *Attorney, Agent, or Firm* — Brinks Hofer Gilson & Lione

(57) ABSTRACT

An NBR composition, which comprises NBR, and white carbon having a specific surface area (BET method) of 30-110 $m^2/g$, preferably 30-60 $m^2/g$, can be vulcanized by a vulcanization system consisting of an organic peroxide and sulfur or a sulfur-generating compound, and can give vulcanization moldings having equivalent compression set characteristics to those of expensive hydrogenated NBR vulcanization moldings, and thus can be effectively used as a vulcanization molding material for seal materials calling for such characteristics, for example, O rings, gaskets, packings, oil seals, etc.

4 Claims, No Drawings

NBR COMPOSITION

RELATED APPLICATIONS

The present application is a 35 U.S.C. §371 national stage filing of International Patent Application No. PCT/JP2007/051235, filed Jan. 26, 2007, to which priority is claimed under 35 U.S.C. §120 and through which priority is claimed under 35 U.S.C. §119 to Japanese Priority Patent Application No. 2006-051785, filed Feb. 28, 2006.

TECHNICAL FIELD

The present invention relates to an NBR composition, and more particularly to an NBR composition capable of giving equivalent compression set characteristics to those of expensive hydrogenated NBR.

BACKGROUND ART

So far well known methods of improving the heat resistance of rubber materials includes addition of silica as a white filler. The present applicant has so far proposed such methods. Besides, several other methods have been also proposed:

Patent Literature 1: JP No. 3704986
Patent Literature 2: JP-A-61-225243
Patent Literature 3: JP-A-2004-75831
Patent Literature 4: JP-A-2005-272580

However, the afore-mentioned Patent Literature 1 proposes use of white carbon having a specific surface area (by nitrogen adsorption method) of not more than 200 m$^2$/g, preferably about 30 to about 130 m$^2$/g, where the rubber materials, to which the white carbon is to be added, is not NBR, but hydrogenated NBR. The afore-mentioned other Patent Literatures make no specific mention of specific surface area of silica.

Furthermore, a rubber composition, which comprises natural rubber or synthetic rubber, a silica-based, reinforcing filler having a specific surface area of not less than 30 m$^2$/g, an acetylenic alcohol (alkylene oxide adduct), and a specific organopolysiloxane, has been also proposed, where the synthetic rubber is exemplified by NBR or hydrogenated NBR, and in Examples precipitated silica (Nipsil LP) having a specific surface area of 230 m$^2$/g is used, but the significance of using smaller specific surface area is nowhere emphasized.

Patent Literature 5: JP No. 2674630

Furthermore, it has been also proposed to add silica (BET method specific surface area: 70-160 m$^2$/g) to NBR for use in vibration-damping rubber or to add silica (BET method specific surface area: 50-400 m$^2$/g) to NBR-containing blend material for use in belts or tires, though their uses are different from the use in seal materials. On the other hand, the compression set characteristics are an important factor for the use in seal materials.

Patent Literature 6: JP-A-2004-217849
Patent Literature 7: JP-A-2000-281839

DISCLOSURE OF THE INVENTION

Problem to be Solved by the Invention

An object of the present invention is to provide an NBR composition for effective use in vulcanization molding materials for seal materials, etc. with improved compression set characteristics, using a cheap NBR in place of expensive hydrogenated NBR.

Means for Solving the Problem

The object of the present invention can be attained by an NBR composition, which comprises NBR, and white carbon having a specific surface area (BET method) of 30-110 m$^2$/g, preferably 30-60 m$^2$/g. The present NBR composition can be vulcanized by a vulcanization system, which comprises an organic peroxide and sulfur or a sulfur-generating compound.

Effect of the Invention

The present NBR composition can give vulcanization moldings having equivalent compression set characteristics to those of vulcanization moldings of expensive hydrogenated NBR, and thus can be effectively used as vulcanization molding materials for seal materials calling for such characteristics, e.g. O rings, gaskets, packings, oil seals, etc.

BEST MODES FOR CARRYING OUT THE INVENTION

NBR for use in the present invention generally has a combined acrylonitrile content of about 15 to about 50%, preferably about 18 to about 45%, and a Mooney viscosity ML$_{1+4}$ (100° C.) of about 40 to about 90.

White carbon (reinforcing silica) for use in the present invention includes dry process white carbon prepared by heat decomposition of halogenated silicic acid or organic silicon compound or by heat reduction of silica sand, and subsequent air oxidation of vaporized SiO, or the like, and wet process white carbon prepared by heat decomposition of sodium silicate, and has a specific surface area (by BET method) of 30-110 m$^2$/g, preferably 30-60 m$^2$/g. Commercially available white carbon for the rubber industry can be generally used as such. When the specific surface area is less than 30 m$^2$/g, the reinforcing effect of white carbon will be lost, whereas when the specific surface area is more than 100 m$^2$/g the compression set of vulcanization molded O ring shaped test piece will be larger than in the case of carbon black compounding, and any effect of compounded silica on the improvement of heat resistance will be no more attained.

The white carbon can be used in a proportion of about 20 to about 80 parts by weight, preferably about 30 to about 60 parts by weight, on the basis of 100 parts by weight of NBR. In the case of a proportion of less than about 20 parts by weight any effect on the improvement of heat resistance, which is one of the desired objects of the present invention, will be no more attained, whereas in the case of a proportion of more than about 80 parts by weight not only kneading will be hard to conduct due to the increased viscosity of the composition, but also the compression set characteristics will be inevitably lowered.

The white carbon-compounded NBR can be cross-linked by about 1 to about 10 parts by weight, preferably about 2 to about 5 parts by weight, of an organic peroxide, on the basis of 100 parts by weight of NBR. The organic peroxide for use in the present invention includes for example, t-butyl peroxide, dicumyl peroxide, t-butylcumyl peroxide, 1,1-di(t-butylperoxy)-3,3,5-trimethylcyclohexane, 2,5-dimethyl-2,5-di (t-butylperoxy)hexane, 2,5-dimethyl-2,5-di(t-butylperoxy) hexine-3, 1,3-di(t-butylperoxyisopropyl)benzene, 2,5-dimethyl-2,5-di(benzoylperoxy)hexane, t-butylperoxybenzoate, t-butylperoxyisopropylcarbonate, n-butyl-4,4-di(t-butylperoxy)valerate, etc.

Together with the organic peroxide, about 0.1 to about 2 parts by weight, preferably about 0.2 to about 1 part by weight, of sulfur or a sulfur-generating compound can be used on the basis of 100 parts by weight of NBR. The sulfur-generating compound for use in the present invention includes, for example, 2,4,6-trimercapto-s-triazine, 4,4'-dithiomorpholine, tetramethylthiuram disulfide, tetraethylthiuram disulfide, tetrabutylthiuram disulfide, 2-mercaptoimidazoline, polymeric polysulfide, etc.

The organic peroxide and sulfur or the sulfur-generating compound are used in a proportion of the former to the latter of about 50 to about 99% by weight: about 50 to about 1% by weight, preferably about 70 to about 95% by weight: about 30 to about 5% by weight. In the case of a proportion of the latter of less than about 1% by weight, the bending fatigue resistance will be deteriorated, whereas in the case of a proportion of the latter of about 50% by weight the vulcanization rate will be lower, so that rubber with a desired degree of vulcanization will be no more obtained at the time of molding.

Divalent metal oxide or hydroxide can be used as an acid acceptor, and includes, for example, MgO, CaO, ZnO, $Mg(OH)_2$, $Ca(OH)_2$, etc., or hydrotalcite $Mg_6Al_2(OH)_{16}CO_3.nH_2O$. The acid acceptor can be used in a proportion of about 3 to about 15 parts by weight, preferably about 5 to about 12 parts, on the basis of 100 parts by weight of NBR.

The NBR composition can appropriately further contain, if necessary, other rubber compounds generally used in the rubber industry than the above-mentioned components, for example, a polyfunctional unsaturated compound such as triallyl (iso)cyanurate, trimethylolpropane trimethacrylate, triallyl trimellitate, etc., a reinforcing agent such as carbon black, etc., a processing aid such as stearic acid, palmitic acid, paraffin wax, etc., an antioxidant, a plasticizer, etc.

The NBR composition can be prepared by kneading through a kneading machine such as Intermix, a kneader, a Banbury mixer, etc. or open rolls, and vulcanization can be carried out generally by heating at about 150° to about 200° C. for about 3 to about 60 minutes, using a vulcanization press such as an injection molding machine, a compression molding machine, an in-place molding machine, etc. If necessary, secondary vulcanization can be carried out by heating at about 120° to about 200° C. for about 1 to about 24 hours.

EXAMPLES

The present invention will be described in detail below, referring to Examples.

Example 1

|  | Parts by weight |
|---|---|
| NBR (PERBUNAN2845, a product of Bayer Co.) | 100 |
| White carbon (sp. surface area 70-110 m²/g) | 30 |
| Antioxidant RD (Nocrac 224, a product of Ouchi-Shinko Chemical Co.) | 1 |
| Zinc oxide | 5 |
| Sulfur | 0.4 |
| Dicumyl peroxide | 2 |
| Vulcanization promoter BZ (Noccelar BZ, a product of Ouchi-Shinko Chemical Co.) | 1.5 |
| Vulcanization promoter DM (Noccelar DM, a product of Ouchi-Shinko Chemical Co.) | 3 |

The foregoing components were kneaded through a kneader and then through open rolls, and the resulting kneaded product was subjected to press vulcanization at 160° C. for 30 minutes and then to oven vulcanization (secondary vulcanization) at 150° C. for 3 hours to obtain a vulcanized sheet (150 mm×150 mm×2 mm) and an O ring, 3.1 mm in diameter.

The vulcanized sheet and O ring were subjected to determination of the following items:

Normal state physical properties: according to JIS K-6253 and JIS K-6251, corresponding to ASTM D412

Compression set: according to JIS K-6262 (25% compression at 120° C.), corresponding to ASTM D395

Example 2

In Example 1, 35 parts by weight of white carbon having a specific surface area of 30-55 m²/g was used.

Comparative Example 1

In Example 1, 20 parts by weight of white carbon having a specific surface area of 150 m²/g was used.

Comparative Example 2

In Example 1, 65 parts by weight of MT carbon black was used in place of the white carbon.

Comparative Example 3

In Example 1, 50 parts by weight of SRF carbon black was used in place of the white carbon.

Reference Example

|  | Parts by weight |
|---|---|
| Hydrogenated NBR (Zetpol 2020, a product of Nippon Zeon Co.) | 100 |
| SRF carbon black | 40 |
| Antioxidant RD | 1 |
| Zinc oxide | 5 |
| Dicumyl peroxide | 4 |

The foregoing components were kneaded through a kneader and then through open rolls, and the resulting kneaded product was subjected to press vulcanization at 160° C. for 30 minutes, and then to oven vulcanization (secondary vulcanization) at 150° C. for 3 hours to obtained a vulcanized sheet (150 mm×150 mm×2 mm) and an O ring, 3.1 mm in diameter. These test pieces were subjected to the same determination as in Example 1.

The results obtained in the foregoing Examples, Comparative Examples, and Reference Example are shown in the following Table.

TABLE

| Items of determination | | Ex. 1 | Ex. 2 | Comp. Ex. 1 | Comp. Ex. 2 | Comp. Ex. 3 | Ref. Ex. |
|---|---|---|---|---|---|---|---|
| Normal state physical properties | | | | | | | |
| Hardness | (Duro A) | 71 | 72 | 69 | 72 | 72 | 71 |
| Tensile strength | (MPa) | 14.6 | 15.7 | 15.3 | 16.3 | 23.1 | 23.8 |
| Ultimate elongation | (%) | 220 | 260 | 300 | 210 | 240 | 220 |
| Compression set | | | | | | | |
| 70 hrs | (%) | 22 | 18 | 31 | 24 | 28 | 18 |
| 140 hrs | (%) | 30 | 27 | 40 | 40 | 42 | 26 |
| 300 hrs | (%) | 49 | 46 | 57 | 65 | 68 | 35 |
| 500 hrs | (%) | 63 | 57 | 71 | 75 | 78 | 46 |

The invention claimed is:

1. An NBR composition, which comprises 100 parts by weight of NBR, 20-80 parts by weight of white carbon having a specific surface area (BET method) of 30-110 m$^2$/g, 1-10 parts by weight of an organic peroxide, and 0.1-2 parts by weight of sulfur or a sulfur-generating compound, where the organic peroxide, and the sulfur or the sulfur-generating compound are in a proportion of the former to the latter of 50-99% by weight: 50-1% by weight as a vulcanization system.

2. An NBR composition according to claim 1, wherein the white carbon has a specific surface area (BET method) of 30-60 m$^2$/g.

3. An NBR composition according to claim 1, for use as a vulcanization molding material for seal materials.

4. Seal materials vulcanization molded from an NBR composition according to claim 3.

* * * * *